Figure 1:
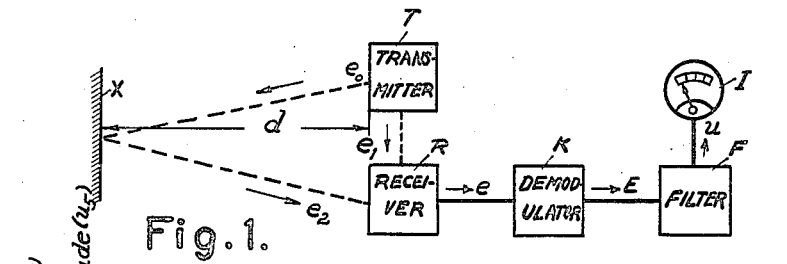

Jan. 6, 1942.   G. GUANELLA   2,268,587
DISTANCE DETERMINING SYSTEM
Filed March 6, 1940   4 Sheets-Sheet 1

INVENTOR
GUSTAV GUANELLA
BY
ATTORNEY

INVENTOR
GUSTAV GUANELLA
BY
ATTORNEY

Jan. 6, 1942.          G. GUANELLA          2,268,587
DISTANCE DETERMINING SYSTEM
Filed March 6, 1940          4 Sheets-Sheet 3

INVENTOR
GUSTAV GUANELLA
BY
ATTORNEY

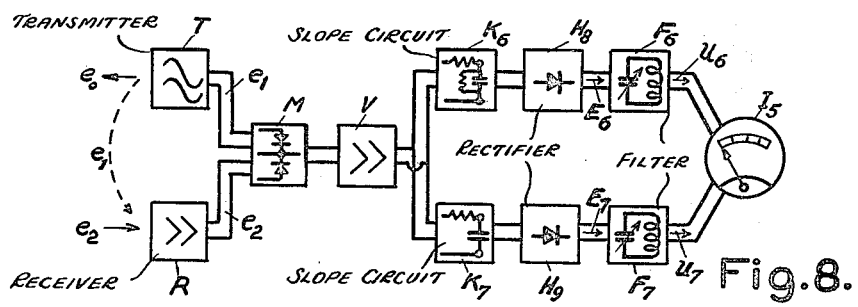
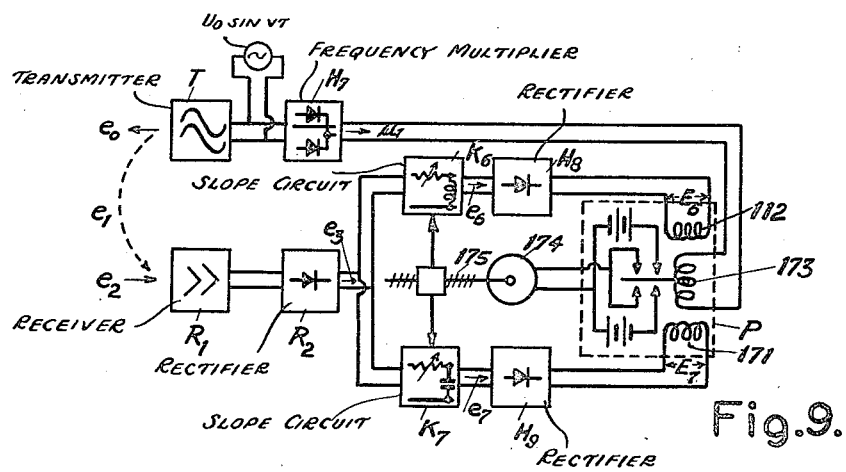
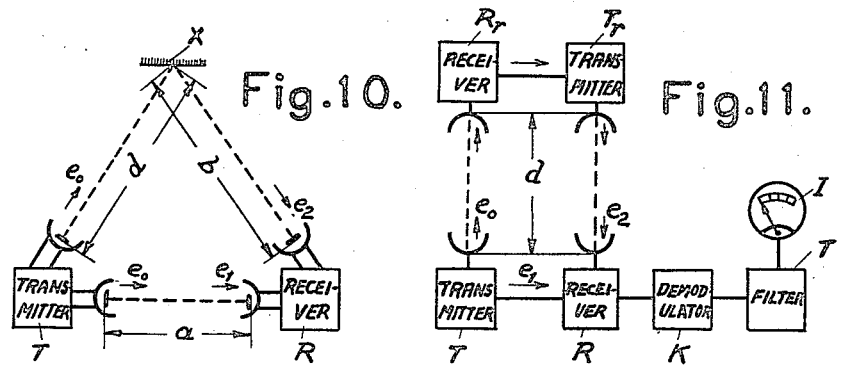

Patented Jan. 6, 1942

2,268,587

UNITED STATES PATENT OFFICE 2,268,587

DISTANCE DETERMINING SYSTEM

Gustav Guanella, Zurich, Switzerland, assignor to Radio Patents Corporation, a corporation of New York Application March 6, 1940, Serial No. 322,459
In Switzerland March 31, 1939

17 Claims. (Cl. 250—1)

The present invention relates to a system for and method of distance determination based on the principle of causing a radiant energy signal to travel to and back from a remote point and determining the distance travelled by measuring the transmitting time elapsed between the transmission and reception of the signal.

More particularly the invention is concerned with distance measuring systems of the above character employing a frequency modulated oscillation transmitted or projected towards a distant point and means for beating the received oscillation with a signal or oscillation directly applied from the transmitter to the receiver and utilizing the beat frequency as a magnitude for determining the distance travelled.

According to a known method for measuring the altitude of an aeroplane above ground, radio waves are transmitted from the plane towards the ground, the frequency of which increases and decreases linearly or uniformly with respect to time. In a system of this type the constant difference between the frequencies of the transmitted and reflected oscillation is proportional to the transmitting time; that is, in turn to the altitude of the plane above ground. Thus, the altitude can be measured by determining the beat frequency between the transmitted and received oscillation. A system of this type is described in detail in the Proceedings of the Institute of Radio Engineers, 1938, page 848, et seq.

In altimeters of the aforementioned type serving as navigation aids for aircraft and the like, undesirable beat frequencies caused by incident interfering signals or disturbances result in substantial errors and impairment of the distance measurement. In particular, if the frequency of the beats to be determined is small compared with the interfering beat frequency, considerable errors may occur in the altitude or distance indication even with a low signal-to-noise ratio of the receiver.

Accordingly, an object of the present invention is the provision of means and a novel method enabling a distance determination substantially without interference and measuring errors caused by disturbing oscillations and other objectionable signals incident upon the receiver.

With this general object in view the invention involves the transmission and reception—after reflection or retransmission from a distant point—of an oscillatory signal whose frequency is subjected to continuous and periodic variations according to a low frequency $u_0$ being a non-uniform or non-linear function with respect to time. At least one periodically varying control magnitude is derived from the beat frequency resulting from the transmitted and reflected oscillations which bears a predetermined relation to the momentary beat frequency. A component or harmonic of this control magnitude is selected by suitable frequency discriminating means and measured to serve as a means for determining the distance travelled by the signals to and from the remote object.

Figure 2:
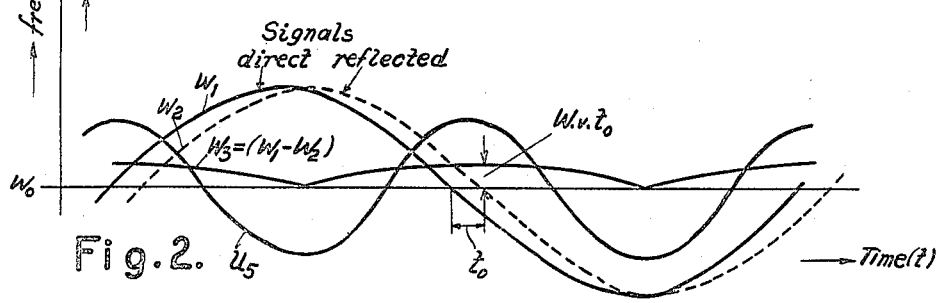

The invention both as regards the underlying principle thereof and the details and means for carrying it into practice will become more apparent from the following detailed description of several practical embodiments thereof taken with reference to the accompanying drawings forming part of this specification and wherein:

Figure 1 shows in block diagram form the general outlay of a system according to the invention, Figure 2 shows theoretical diagrams explanatory of the function and operation of the invention, Figures 3 to 7 are schematic circuit diagrams illustrating various modifications of a distance measuring system designed and operating in accordance with the invention, Figures 8 and 9 illustrate in block diagram form further modifications for practicing the invention, Figure 10 is a block diagram illustrating the inventive system with transmitting and receiving stations spaced at a considerable distance, Figure 11 illustrates in block diagram form an arrangement according to the invention for transmitting a signal to a remote point and relaying or retransmitting the signal back to the point of transmission for determining the distance of said point from the transmitter in accordance with the invention.

Referring more particularly to Figure 1 showing the general outlay of a distance determining system according to the invention, item T represents the radiant energy transmitter such as a radio transmitter and R the receiver placed close to each other, such as on an aeroplane or at any other desired location. A portion $e_1$ of the frequency modulated oscillations $e_0$ generated by the transmitter T is directly applied to the receiver R, whilst another portion $e_2$ of the oscillations is transmitted or projected towards a distant point or object X and returned to the receiver R by retransmission or reflection as indicated by the dashed line in the diagram. If the distance of the object X is equal to $d$ and the velocity of pagation equal to $c$, the period $t_0$ required for signal to travel to and from the remote point determined as follows:

$$t_0 = \frac{2d}{c} \quad (1)$$

other words, the reflected signal $e_2$ will arrive the receiver R with a time delay $t_0$ compared h the directly transmitted signal $e_1$. By measng this time delay or transmission period, the tance $d$ may be determined as is understood m the above.

he signals $e_1$ and $e_2$ are mixed or intermodud in the receiver R in such a manner that the quency $w$ of the output signal $e$ of the receiver l be equal to the beat frequency $w_3$ between nd $e_2$. Due to the non-uniform periodic varon of the transmitting frequency, this beat uency also has a periodic character starting m zero to a maximum and back to zero again, is understood. By applying the signal $e$ to a quency control device or frequency demodur K a control magnitude E is produced havan amplitude which bears a predetermined tion to the momentary beat frequency been the signals $e_1$ and $e_2$. The amplitude of at st one component or harmonic $u$ of this conl magnitude is measured by an indicating inment I which may be directly calibrated in ts of distance $d$, while the effect of all the reining components and interfering signals is pressed by a frequency discriminating argement or a filter F. Thus, in contrast to the ve mentioned known method, the invention olves the use of a determined frequency comtent of a periodically varying magnitude for purpose of distance determination.

he function and operation of the inventive thod is further understood from the following: angular frequency $w_1$ of the transmitter T is iodically varied about a mean value $w_0$ as wn in Figure 2, curve $w_1$ representing frency as ordinate in respect to time as abscissa. case of pure frequency modulation in accorde with a low frequency oscillation $$u_0 = U_0 \sin vt \quad (2)$$

erein $U_0$ represents the amplitude and $v$ the ular frequency, the oscillation transmitted l directly applied to the receiver is representby the following mathematical expression:

$$e_1 = E_1 \sin(w_0 t - B_0 \cos vt) \quad (3)$$

erein $E_1$ represents the constant amplitude l $B_0.v = W$ represents the frequency swing or iation from the main or carrier frequency that is, the maximum frequency variation of transmitted oscillations. The momentary uency $w_1$ of this oscillation is then expressed ollows:

$$w_1 = \frac{d(w_0 t - B_0 \cos vt)}{dt} = w_0 + W \sin vt \quad (4)$$

he oscillation $e_2$ reflected or retransmitted n the remote point X will arrive at the reer with a delay $t_0$ according to Equation 1; t is, $e_2$ is represented by the following exssion:

$$e_2 = E_2 \sin[w_0(t-t_0) - B_0 \cos v(t-t_0)] \quad (5)$$

the momentary frequency of this reflected llation will be as follows:

$$w_2 = w_0 + W \sin v(t-t_0) \quad (6)$$

The two oscillations $e_1$ and $e_2$ result in a beat in the receiver having the following frequency:

$$w_3 = w_1 - w_2 = W[\sin vt - \sin v(t-t_0)] \quad (7)$$

Since $v.t_0$ in practice is always small compared with 1, Equation 7 may be written with sufficient approximation as follows:

$$w_3 = W.v.t_0.[\cos vt] \quad (8)$$

This beat frequency fluctuates in the rhythm of the low frequency $v$ between zero and a maximum value $W.v.t_0$, which is dependent upon the transmitting period $t_0$ and may serve as a measure of the distance $d$. Since a negative sign of $w_3$ has no practical meaning, the special brackets: [cos $vt$] indicate that the positive absolute values are to be used in the formula. In carrying out the method, the conditions should be chosen in such a manner that the average beat frequency for the travelling periods to be dealt with is large compared with the modulating frequency $v$.

By rectification of the frequency mixture $(e_1 + e_2)$ a medium frequency signal $e_3$ is produced in a known manner whose frequency corresponds at all times to the beat frequency and which is expressed as follows:

$$e_3 = E_3 \cos(\int w_3.dt) = E_3 \cos(W.t_0. \sin vt) \quad (9)$$

Such a medium frequency signal may also be obtained by mutually intermodulating the oscillations $e_1$ and $e_2$, it being well known that a difference frequency is obtained by such intermodulation.

According to the present invention, the frequency $w_3$ of $e_3$ is tested by the aid of means which are selective to the periodic frequency variations in the rhythm of the low frequency in such a manner as to substantially suppress the effect of disturbing signals. This control is effected by the aid of a periodically varying magnitude having an amplitude whose frequency bears a predetermined relation to the frequency $w_3$ and is subjected to the same periodic fluctuations as the latter. By transmitting this magnitude through a suitable frequency discriminating filter or applying it to any other discriminating device, the effect of interfering signals is substantially reduced or eliminated. From the magnitude thus filtered the average beat frequency and in turn the distance $d$ is determined by a simple amplitude measurement.

There are various ways for producing a control magnitude and suppressing undesirable components of this magnitude and other interfering signals. Thus, for instance, $e_3$ may be rectified to obtain a potential $E_3$ varying according to the amplitude of $e_3$. This amplitude is maintained constant independently of amplitude fluctuations of the transmitted and received oscillations $e_1$ and $e_2$ as caused by fading, etc., by utilizing $E_3$ as a control potential for automatically maintaining the amplification of the receiver at a constant value, thereby substantially eliminating any amplitude fluctuation of the output signal $e_3$. In order to produce a control potential $E_5$ proportional to the distance $d$, the potential $e_3$ maintained at a constant amplitude in the manner as above described is transmitted through a network having a varying propagation factor $p(w)$ dependent on frequency, whereby the output of this network supplies an alternating potential $e_5$ expressed as follows:

$$e_5 = p(w_3).e_3 = E_3.p(w_3). \cos(\int w_3 dt) \quad (10)$$

By rectification of this signal there is obtained a control potential:

$$E_5 = E_3 . p(w_3) \quad (11)$$

If the amplitude $E_3$ is maintained at a constant value and if $p(w)$ is directly proportional to the frequency, the propagation factor due to Equation 8 and for $A_1$ being a constant will be as follows:

$$p(w_3) = A_1 . w_3 \quad (12)$$

resulting in the following control potential:

$$E_5 = E_3 . A_1 . w_3 = A_5 . W . v . t_0 . [\cos vt] =$$
$$\frac{4}{\pi} A_5 . W . v . t_0 \left( \frac{1}{2} + \frac{\cos 2vt}{1.3} - \frac{\cos 4vt}{3.5} + \frac{\cos 6vt}{5.7} - \cdots \right) \quad (13)$$

From this frequency mixture a determined component is segregated by an electric filter impervious to direct current such as for instance the second harmonic or component having a frequency $2v$, thereby obtaining a sinusoidal low frequency potential as follows:

$$u_5 = \frac{4}{3\pi} . A_5 . W . v . t_0 \cos 2vt = B_5 . t_0 \cos 2vt \quad (14)$$

whose amplitude in case of $B_5$ being a constant is proportional to the transmitting period $t_0$. By this selective segregation the disturbing components contained in the controlling magnitude $B_5$ of various origins are substantially eliminated. By measurement of $u_5$ by the aid of a suitably calibrated alternating current instrument it is possible to obtain a direct indication of the distances $d$ in accordance with Expressions 1 and 14. Also, in case of a non-linear function of the propagation ratio $p(w)$ of the filter transmitting the oscillation $e_3$ a direct indication of the distance is possible by a corresponding non-linear calibration of the indicating instrument.

In case of frequency modulation of the carrier frequency $w_0$ in accordance with a periodic but non-sinusoidal low frequency $u_0$, the amplitudes of the individual components of the control potential will deviate from the values given in Equation 13 but by suitably choosing the shape of $u_0$, $E_5$ may be such as to contain only a single alternating current component in which case no further components are suppressed by the filter circuit.

A controlling magnitude which corresponds at all times to the momentary frequency of $e_3$ may further be produced by regulating the amplitude $E_3$ of $e_3$ by the aid of an automatic gain control arrangement in such a manner that the rectified output potential $E_5$ has a constant amplitude. If the propagation factor $p(w)$ is inversely proportional to the frequency; that is, if $$p(w) = \frac{A_0}{w} \quad (15)$$

the amplitude $E_3$ will be as follows:

$$E_3 = \frac{E_5}{p(w_3)} = \frac{E_5}{A_0} w_3 = A_3 . w_3 \quad (16)$$

wherein $A_3$ is a constant if the amplitude $E_5$ is of constant value. In this case a similar relationship exists for the potential $E_3$ to that given in Equation 13 whereby this potential may serve as a control magnitude in a manner as described hereinabove.

Since an accurate amplitude control of $E_3$ or $E_5$ in the manner described often involves great difficulties, it is advantageous according to a feature of the invention to determine the ratio $q$ of the amplitudes of $u_5$ and $u_3$ which ratio, for reasons as will be obvious, depends solely upon the propagation ratio $p(w)$ dependent on frequency, while any simultaneous amplitude variations of $e_3$ and $u_5$ will be without influence this ratio.

This ratio may, for instance, be determined the form of the quotient of the direct potential $U_5$ and $E_3$ obtained from $u_5$ and $e_3$ by rectification and subsequent filtering. According to embodiment, these direct potentials are applied to the relatively displaced coils of a crossed-coil single-pointer ratio meter which may be direct calibrated in values of the distance $d$. If $p($ is proportional to the frequency, the amplitude $U_5$ of $u_5$ according to Equation 14 is as follows $$U_5 = B_5 . t_0 \quad (1$$

Since $B_5$ is proportional to the amplitude $A_5$ a in turn to the amplitude $E_3$ of $e_3$, the ratio $q$ determined as follows:

$$q = \frac{U_5}{E_3} = C_5 . t_0 \quad ($$

wherein $C_5$ is a constant which is independent of amplitude.

The comparison of $u_5$ and $e_3$ or $U_5$ and $E_3$ respectively, may also be effected by deriving from $e_3$ a potential $e_8$ by means of a network having an adjustable amplitude propagation ratio independent of frequency and by equalizing the amplitude $E_8$ of $e_8$ with the amplitude $U_5$ of by adjusting the propagation ratio by the aid a suitable adjusting member. The adjusting position of the network is representative of the amplitude ratio $q$ (see Equation 18) and in turn of the distance $d$ which latter may be direct read from a suitable scale associated with the adjusting member.

A selective control of a determined component of the control magnitude $E_5$ such as according to Equation 13 is furthermore possible by forming a product of this magnitude and a harmonic segregated from the low frequency $u_0$ employed to frequency modulate the transmitted oscillations such as the second harmonic:

$$u_2 = U_2 \cos 2vt \quad (1$$

This product $u_7$ has an average or mean value $$U_7 = \frac{2}{3\pi} A_5 . A_7 . W . v . t_0 = B_7 . t_0 \quad ($$

which is dependent only upon the component having a frequency $2v$. By this selective suppression of the effect of all components of the control magnitude deviating from a predetermined frequency; i. e. $2v$ in the example chosen a special filter or selective means are dispensed with. The formation of the mean product may be effected in a known manner by intermodulating the respective electrical magnitudes and by subsequent smoothing or by directly producing a combined mechanical torque by means of watt meter type instrument.

Finally, the distance determination may effected by a pair of control magnitudes dependent upon the frequency according to different laws or relationships. Thus, a first alternating potential $e_5$ may be produced by transmitting $e_3$ through a first network having transmission ratio $p_1(w)$ dependent upon frequency, while a second alternating potential is produced likewise by transmitting $e_3$ through a second network having a different propagation ratio dependent upon frequency $p_2(w)$. Thus both $e_5$ and $e_6$ are determined by relations according to Equation 10. By rectification of th nating potentials, potentials $E_5$ and $E_6$ are
...ned according to Equation 11 which vary
...dically in the rhythm of the low frequency.
...rding to a practical example $p_1(w)$ may be
...tly proportional to the frequency whereby
... determined as shown by Equation 13, while
...) is proportional to the square of the fre-
...cy whereby $p_2(w_3)$ and $E_6$ are determined,
...ctively, by the following expressions:

$$p_2(w_3) = A_2.w_3^2 \quad (21)$$

$$E_6 = E_3.A_2.w_3^2 = \tfrac{1}{2}A_6.W^2.v^2.t_0^2(1+\cos 2vt)$$

control potential contains a component $$u_6 = B_6.t_0^2 . \cos 2vt \quad (22)$$

...g an amplitude $U_6 = B_6.t_0^2$. The ratio be-
...n $u_6$ and the component $u_5$ contained in $E_5$
...ding to Equation 14 is directly proportional
...e transmitting period $t_0$ and in turn to the
...nce $d$ according to the following expression:

$$q_6 = \frac{u_6}{u_5} = C_6.t_0 \quad (23)$$

same applies to the ratio between the poten-
...$U_5$ and $U_6$ obtained by rectification of $u_5$
...$u_6$, respectively. This quotient can be
...ured by the aid of any known ratio indicat-
...levice such as a crossed-coil ratio meter. In
...r to substantially eliminate all interfering
...onents, $u_5$ and $u_6$ are passed through electri-
...ilters and/or the comparison of these poten-
...is effected by means of a frequency selec-
...method. The variations of $p_1(w)$ and $p_2(w)$
...pendence upon frequency may deviate from
...examples given in Equations 12 and 21 in
...h case too the quotient $q$ is related to the
...r period $t_0$ according to a definite, though
...lost cases non-linear, law.
...the momentary frequency $w_3$ of the beat fre-
...cy potential $e_3$ is too high or too small for
...ucing a control potential in dependence upon
...iency, a new intermediate frequency poten-
...$_4$ may be produced by frequency multiplica-
...or sub-division having a frequency $$w_4 = n.w_3 \quad (24)$$

...ein $n$ is an integer number or fraction with
...iteger denominator. From $e_4$ there is derived
...east one control magnitude $E_5$ dependent
... frequency serving for indicating the trans-
...ng period or distance in the manner de-
...ed hereinabove. This transmitting period
...rding to Equation 8 is proportional to the
... frequency $w_3$. Since in this case instead of
...here is present an $n$ times higher frequency
...here is obtained in accordance with Equation
...n indication equal to $n$ times the travelling
...d. This may be taken into consideration by
...ble calibration of the indicating instru-
...

a frequency multiplication or sub-division
... is not practicable, the frequency of the
...ls $e_1$ and $e_2$ to be compared may be stepped
... down to obtain new signals $e_{11}$ and $e_{12}$ hav-
...requencies $w_{11}$ and $w_{12}$ as follows:

$$w_{11} = n.w_1 \quad (25a)$$

$$w_{12} = n.w_2 \quad (25b)$$

...ectification or intermodulation of these sig-
...a new intermediate signal having a differ-
...frequency $w_4$ is obtained in accordance with
...tion 24.
...e oscillations utilized for the distance deter-
...tion in accordance with the invention may
be of any desired character in accordance with existing requirements such as electro-magnetic waves, in particular short or ultra short waves, acoustic or compressional oscillations whose frequency may be within the superaudible or any other range as may be desired. In determining the distance of a reflecting point lying in a definite direction, it is advisable to use directional transmitting and receiving devices. In determining the distances along electrical conductors, the oscillations may be impressed upon the conductors in the form of electric currents or potentials.

The oscillations of varying frequency may furthermore be transmitted to the distant point in the form of a modulated carrier which latter may be an electro-magnetic or a mechanical wave. This carrier wave which originally has a constant frequency is decomposed into at least two side bands by the modulation in accordance with the variable frequency signals, the frequency of the side bands being also variable. At the receiver input there are produced by demodulation the oscillations retarded in proportion to the travelling distance and whose frequency varies periodically and continuously. It is advisable to employ amplitude modulation for this type of carrier transmission in which case the amplitude of the transmitted oscillations varies according to the momentary value of the frequency modulated oscillations. Such a transmission is advantageous if the transmitting medium is not suited for transmission of oscillations of varying frequency or if better results are obtained with a transmitter and receiver for high frequencies and a correspondingly reduced modulation band width.

Figure 3:
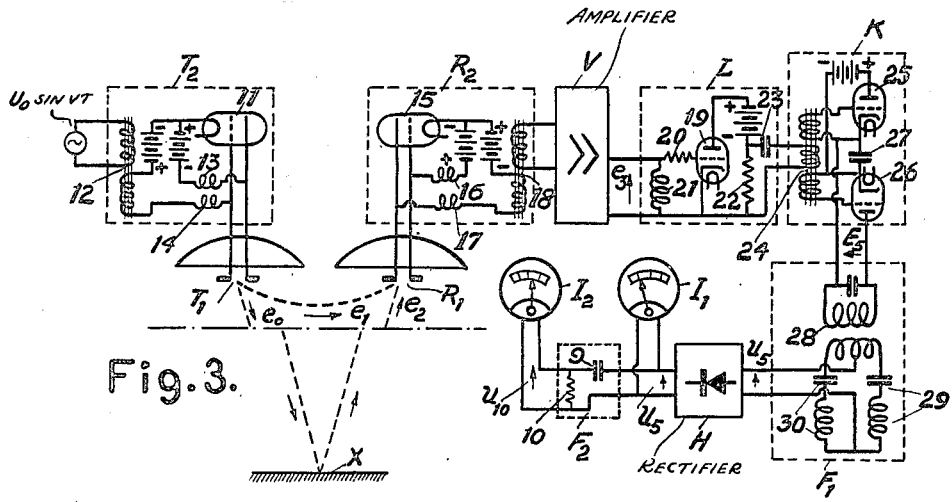

Referring more particularly to Figure 3 of the drawings, there is shown a system suited, although not limitatively, for determining the altitude of an aeroplane above the ground X by means of ultra short electric waves. The transmitter $T_2$ comprises a three-electrode vacuum tube 11 arranged in so-called braking field connection to produce mico-ray electric waves of extremely short wave length in accordance with the Barkhausen method. For this purpose the grid is maintained at a high positive potential by means of a battery or the like connected to the grid in series with a choke coil 14, while the plate is maintained at zero or slightly negative potential relative to the cathode by the aid of a further battery in series with choke coil 13. As is well known, the frequency of an electron oscillator of this type is dependent to a substantial degree upon the operating potential, in particular the grid potential, whereby frequency modulation in the rhythm of a low frequency potential $u_0$ is effected in a simple manner by superimposing the potential $u_0$ by way of a transformer 12 upon the steady grid potential such as shown in the diagram. The high frequency oscillations are transmitted through a Lecher wire system to the directional radiating system $T_1$ comprising in the example shown a dipole antenna located at the focus of a parabolic reflector. The oscillations $e_0$ thus transmitted in the form of a narrow beam are reflected by the object X (ground) and will arrive at the directional receiver $R_1$ in the form of oscillations $e_2$ being retarded relative to the directly transmitted oscillations $e_1$ from the transmitter to the receiver, the delay period depending upon the travelling time to and from the distant object. In the receiver $R_2$ there are produced by combination of the oscillations $e_1$ and $e_2$ beats having a frequency $w_3$ according to Equations 7 and 8. The receiver $R_2$ shown comprises a circuit similar to that of the transmitter $T_2$ embodying a three-electrode tube 15 arranged in braking field connection with positive and negative potential sources connected to the grid and anode through choke coils 16 and 17, respectively. By suitable adjustment of the operating constants of such a circuit, the average anode potential varies in the rhythm of the beat frequency. This beat frequency potential is transmitted by way of transformer 18 to an amplifier V. After amplification in the latter, the intermediate frequency potential $e_3$ is applied to an amplitude limiting system L serving to suppress the effect of amplitude fluctuations caused by fading, etc., upon the distance indication. The limiting device in the example shown has the form of a three-electrode vacuum tube 19 to the grid of which the oscillations $e_3$ are applied by way of a coupling inductance 21 and a resistance 20 in series with the grid circuit. Since a positive grid potential is avoided by the grid current flowing through the resistance 20 and as the anode current decreases rapidly when the grid becomes negative, there are developed across the anode resistance 22 a series of impulses at a frequency $w_3$ of constant amplitude substantially independently of the amplitude of the input oscillations.

The measurement of the frequency $w_3$ for determining the travelling period $t_0$ may be effected by applying the output signal of the limiter L to a filter or network having a propagation ratio dependent upon frequency and subsequent amplitude measurement. In the example illustrated in Figure 3, there is provided a different converting system K not requiring any special filters and adapted to produce a potential $E_5$ being proportional at all times to the momentary frequency $w_3$. The function of the system K is as follows: the output impulses of constant amplitude and varying frequency supplied by the limiter L are impressed upon two vacuum tubes 25 and 26 by way of a coupling condenser 23 and input transformer 24 in such a manner that the tubes are rendered conductive in alternate succession. If the grid of tube 25 is positive, the condenser 27 interposed between the cathodes of the tubes is charged through the tube 25 to the plate battery potential. This charge will then flow through the tube 26 to the transformer 28 during the following half cycle when the grid of tube 26 is at positive potential. This transport of the charges of the condenser 27 will be repeated in the rhythm of the frequency $w_3$, whereby the current through the transformer 28 will be proportional to the frequency $w_3$ at all times. There is segregated from the control magnitude $E_5$ obtained in this manner, by means of a filter $F_1$ a definite component $u_5$ whose amplitude varies in proportion to the transmitting period $t_0$ according to Equation 14 and serves as a direct indication of the distance $d$. The filter $F_1$ in the example shown is of the bridge type comprising a pair of series resonant circuits 29 and 30 tuned slightly above and below the frequency of the component $u_5$. All disturbing components of the control potential $E_5$ which fall outside the pass range of this filter are thus suppressed and prevented from impairing the distance measurement. The component $u_5$ may be measured by means of an alternating current instrument or by a direct current instrument $I_1$ after rectification by means of a rectifier H. This instrument may be directly calibrated in values of distance which is proportional to the rectified or direct potential $U_5$. By impressing a portion of $U_5$ upon the network $F_2$ comprising series condenser 9 and parallel resistance 10, there is produced an additional magnitude $U_{10}$ being proportional to the differential quotient or rate of change of $U_5$. By measuring this magnitude by means of an additional instrument $I_2$, it is possible to directly indicate the speed or rate of change of the distance $d$. This indication may be desirable as a navigation aid for aircraft to indicate the rate of ascent or descent, respectively. As is understood, an arrangement as shown in Figure 3 is by no means limited to altitude measurement but may be employed for determining the distance and/or relative speed between any two points or objects.

Figure 4:
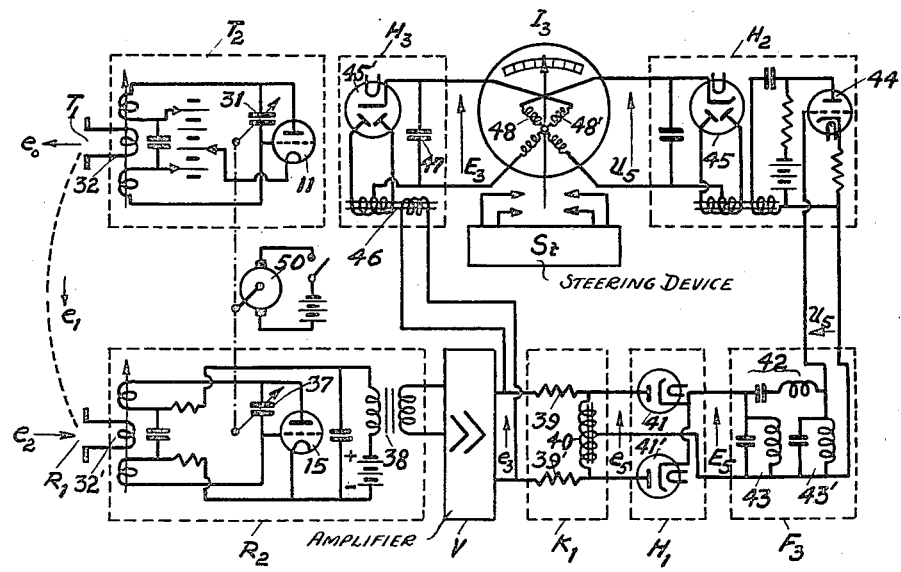

In the modified arrangement according to Figure 4, high frequency oscillations are produced in the transmitter $T_2$ by the aid of a vacuum tube oscillator 11 having anode and grid circuits arranged in regenerative relationship in a manner well known. The tuning capacity 31 is periodically varied in the rhythm of a low frequency $v$ by means of a motor 50 driving the shaft of a variable rotary condenser having plates suitably shaped so as to obtain a desired, such as a pure sinusoidal, frequency modulation of the waves or oscillations $e_0$ emitted by the dipole radiator $T_1$ as represented in Equation 3. The dipole is connected to the oscillator in any suitable manner such as by way of coupling coil 32 and a Lecher wire, concentric cable or the like. The receiving antenna $R_1$ is excited by a portion of the radiated oscillations $e_1$ directly and by a further portion $e_2$ after transmission and reflection from the distance point or object (not shown). Due to the difference in travelling time, the two oscillations will cause beats in the receiver $R_2$ having a frequency $w_3$ in such a manner that by virtue of the rectification by tube 15 and amplification in V an intermediate frequency potential $e_3$ is produced according to Expression 9. The received oscillations are applied to the receiver circuit through a coupling coil 32' and the rectified intermediate frequency signals are transmitted to the amplifier V through a repeater or transformer 38. The tuning of the receiver circuit by means of the variable capacity 37 is synchronized with the tuning variations of the transmitter by directly mounting the variable tuning condenser 37 upon the shaft of the driving motor 50 as indicated in the diagram. In this manner, the receiver tuning corresponds at all times to the momentary transmitting frequency making it possible, even in case of very large frequency swings, to employ a receiver having a comparatively narrow band width thereby ensuring a minimum of interfering signals simultaneously received with the useful signal oscillations.

The intermediate frequency signal $e_3$ serves on the one hand to produce a potential $E_3$ varying in accordance with the amplitude of the signal $e_3$ by the aid of a rectifying system $H_3$ comprising a double diode rectifier 45, input transformer 46 and smoothing condenser 47 arranged in a manner well understood by those skilled in the art. At the same time the signal $e_3$ is impressed upon a filter or frequency demodulator network $K_1$ comprising in the example shown a pair of series resistances 39 and 39' and a parallel inductance 40, whereby there is developed across the inductance a potential $e_5$ having an amplitude ying in proportion to the frequency of the
ut signal $e_3$. The signal $e_5$ is rectified by
ins of a double wave rectifier system $H_1$,
iprising a pair of diode rectifiers 41 and 41'
ilting in a control magnitude or potential
varying in accordance with the momentary
olitude of $e_3$ and in turn being related ac-
ling to a definite law or relationship to the
mentary beat frequency $w_3$. If the inductive
iedance of 40 is small compared with the
iic resistance of 39 and 39' the conversion
n varying frequency to amplitude will be ac-
ling to the Expression 13. By means of a
ir or network $F_3$ which in the example shown
iprises a pair of parallel resonant circuits 43
i 43' and a series resonant circuit 42, a defi-
: component $u_5$ is segregated from the poten-
$E_5$. This component $u_5$ is amplified by
ins of an amplifier 44 forming part of a fur-
r rectifying system $H_2$ and the amplified
iponent then rectified by the aid of a double
ie rectifier 45, thus obtaining a direct poten-
$U_5$ varying in proportion to the amplitude of
By comparing $U_5$ and $E_3$ there is obtained
ording to the Expression 18 an indication of
transmission time substantially independent-
of any amplitude fluctuations. This com-
ison is effected in the example shown by ap-
ng the potentials $E_3$ and $U_5$ to the two dis-
:ed coils 48 and 48' of a crossed-coil ratio
er $I_3$ indicating the quotient $q$ and in turn
transmission period $t_0$ or the distance $d$ to
determined.
rrangements of the type shown in Figure 4
specially suited for use in such cases where
signals are subjected to substantial ampli-
e fluctuations during the transmission, such
aused by fading, atmospheric conditions, etc.
en using an arrangement as described on a
/able craft such as on an aeroplane, ship, etc.,
steering mechanism of the craft may be di-
:ly controlled by the distance or altitude
er in such a manner as to maintain a desired
iimum height or distance from ground or ob-
:les such as mountains or elevated structures,
o prevent the craft from exceeding a prede-
nined maximum altitude or distance from a
:n point. This object can be accomplished
in easy manner by closing a separate electric
trol circuit operating the steering mechanism
by means of electrical contacts cooperating
1 the points or other movable member of the
tient meter instrument.
:eferring to Figure 5, there is shown an al-
iative arrangement for eliminating the effect
implitude fluctuations of the signals by means
a compensation method for indicating the
iponent $u_5$ or in turn the distance $d$ to be de-
nined. There is shown an oscillator O com-
iing an oscillating tube 51 with grid and plate
:uits arranged in regenerative coupling re-
on. The oscillatory or grid tank circuit in-
les a variable condenser 54 and an iron core
uctance coil 53. The frequency modulation
:he oscillations, according to a low frequency
s effected by the aid of a toothed wheel 56 be-
continuously rotated in front of the iron
e of the inductance coil 53 by the aid of a
/ing motor 55. In this manner the induct-
e of the coil 53 is varied periodically at a defi-
: frequency $v$ resulting in a corresponding
juency modulation of the oscillations $e_0$ ap-
d to the power amplifier $T_2$ and the transmit-
$T_1$. The latter may be a wireless transmit-
or as shown in the diagram, an electro-acous-
tic converter or microphone for producing com-
pressional or acoustic waves $e_0$ to be transmitted
through water or any other suitable medium.
The reflected waves $e_2$ are received by a suitable
pick-up device such as a microphone receiver $R_1$.
Disregarding for the moment the arrangements
$H_4$ and $H_5$, the oscillations $e_2$ amplified in the
receiver $R_2$ are combined or intermodulated with
the oscillation $e_0$ directly transmitted from the
transmitter to the receiver by means of a bal-
anced modulating system M comprising a pair of
vacuum tubes 58 and 58'. The oscillations $e_2$ are
applied to the grids of the tubes in opposite
phase relation by way of coupling transformer
57, while the oscillations $e_0$ are applied to the
grids in like phase by way of the center tap of
the secondary of the transformer 57. By suit-
able filtering by the aid of condenser 60 there
is obtained in the output of the modulator M an
intermediate frequency potential $e_4$ having a
variable frequency $w_3$. The potential $e_4$ is ap-
plied to a network or demodulator $K_2$ compris-
ing series inductances 61 and 61' and parallel re-
sistance 62 and having a propagation ratio de-
pendent upon frequency to produce a potential
$E_5$ having an amplitude varying in proportion to
the momentary frequency $W_3$ as determined by
the filter constants 61, 61', 62. The potential
$E_5$ is rectified by means of a rectifier $H_6$ compris-
ing four rectifying elements forming a Wheat-
stone bridge circuit and smoothing condenser 64,
and the rectified potential $E_5$ varying in the
rhythm of the low frequency determined by the
rotation of the disc 56 is passed through a filter
$F_4$ comprising series resonant circuit 65 and 65'
shunted by a parallel resonant circuit 66 to de-
rive a definite component $u_5$ in a manner simi-
lar to that described hereinabove. This compo-
nent is impressed upon one coil of a differential
relay system P the other coil of which is ener-
gized by a portion of the component $e_4$ through
a potentiometer 72 forming part of a balancing
system D and having a variable contact member
supplying a potential $e_8$. By adjusting the po-
tential $e_8$ by means of the potentiometer 72 in
the balancing system D, its amplitude is com-
pared with the amplitude of the potential $u_5$ by
the action of the differential relay as described
in the following; if the amplitudes of $u_5$ and $e_8$
are unequal, the motor 70 and with it the geared
shaft 71 is set into rotation in the one or the
other direction by the differential relay closing
the circuit of a positive or negative battery, re-
spectively, energizing the motor. In this manner
the potentiometer 72 will be adjusted to a point
where the amplitudes of the currents in both re-
lay windings are equal and the relay armature
is maintained in the balance position. The po-
sition of the variable contact member for the po-
tentiometer 72 is then an indication of the am-
plitude ratio between the potentials $e_5$ and $e_8$.
This ratio may be directly read on a scale 73 cal-
ibrated in values of the distance $d$. In place of
an alternating current relay a direct current po-
larized relay may be employed excited by po-
tentials $E_5$ and $U_8$ obtained by rectification of
the potentials $e_5$ and $e_8$, respectively.
The frequencies of the oscillations $e_1$ and $e_2$
may be increased before their modulation in M
by means of frequency multiplying circuits $H_4$
and $H_5$, thereby obtaining frequencies $e_{11}$ and
$e_{12}$ according to Expression 25 having frequen-
cies $w_{11}$ and $w_{12}$, respectively, differing by an in-
teger factor $n$ from the original frequencies.
Since the frequency of the intermediate signal $e_4$ obtained as a result of the modulation is increased over the original frequency $e_3$ by the factor $n$, the indication will now be proportional to $n.t_0$ which may be taken into consideration by a suitable calibration of the indicator. Instead of frequency multiplication, the frequency may be sub-divided to suit existing requirements. In many cases it is desirable to operate a warning signal for extreme values of the distance $d$. Such a signal which may be of optical or acoustic character such as an electric bell 74 is operated whenever a predetermined travelling period $t_0$ causes a corresponding position of the adjusting member for potentiometer 72 and closes a pair of contacts 74'.

Figure 6:
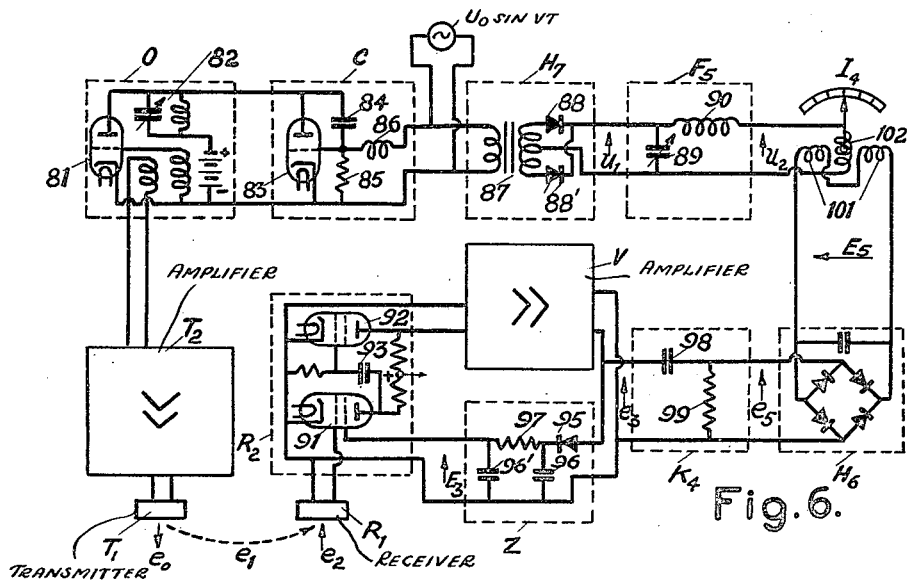

Referring to Figure 6 there is shown an arrangement for selectively measuring a component of the control potential by the aid of a watt meter type instrument. Item C represents a control circuit comprising an electron tube 83 having its grid connected to the junction point between a series network comprising a condenser 84 and a resistance 85. Such an arrangement results in a wattless reaction, whereby the alternating potential on the grid of the tube is displaced by 90° with respect to the plate potential. Accordingly, the plate current is also in quadrature with the plate voltage or in other words, the tube represents a capacitative reactance the value of which depends upon the degree of amplification which may be varied in an easy manner in accordance with the low frequency $u_0$ impressed upon the grid by way of choke coil 86. By the aid of this variable electronic capacity shunted across the oscillatory tank circuit 82 of the regenerative oscillator O, the oscillations generated by the latter are frequency modulated in accordance with the low frequency variations $u_0$. The oscillations after amplification by means of power amplifier $T_2$ are converted according to the example shown in the transmitter $T_1$ into superaudible oscillations or compressional waves $e_0$ to be transmitted through water or any other suitable medium. A portion $e_1$ of the oscillations directly reaches the receiver $R_1$ while another portion arrives as a retarded oscillation $e_2$ after travelling to and from a remote object whose distance it is desired to determine. The receiver $R_1$ which may be a microphone or the like serves to translate the mechanical or compressional waves into corresponding electrical oscillations which latter are combined and amplified in the input of tube 91 of the receiver $R_2$ and detected such as by an audion detector 92 provided with a grid condenser 93 and grid leak in a manner well known. The rectified oscillations of intermediate or beat frequency are further amplified by means of an amplifier V, thereby obtaining an alternating potential $e_3$ having a frequency equal to the beat frequency $w_3$. By rectifying a portion of $e_3$ by means of a circuit Z comprising a rectifier 95 and smoothing filter composed of series resistance 97 and a pair of parallel condensers 96 and 96', there is obtained an amplitude control (A. V. C.) potential $E_3$ which is impressed upon the grid of the input amplifier tube 91 in counteracting relation to the amplitude variations of the received signals in such a manner as to maintain the amplitude of the output potential $e_3$ constant. As the received oscillations may be amplitude modulated in accordance with the low frequency $v$, the intermediate frequency obtained in the output of the detector 92 may be equally amplitude modulated and in order to suppress this undesired modulation the time constant of the filter 96, 96', 97 is chosen sufficiently high with respect to the oscillating period of the low frequency potential $u_0$. The potential $e_3$ is applied to the filter or demodulator $K_4$ comprising in the example shown a series condenser 98 and parallel resistance 99 to convert the frequency modulated potential into an amplitude modulated potential $e_5$ in substantially the same manner that described in connection with the preceding figures. The amplitude modulated potential is rectified by the aid of rectifiers $H_6$ consisting in the example shown of a rectifier bridge to obtain a final control potential $E_5$ varying in the rhythm of the low frequency $v$.

There is further provided a frequency multiplying circuit $H_7$ comprising input transformer 87 energized by a portion of the modulating potential $u_0$ and a pair of rectifiers 88 and 88' arranged in a double wave rectifying system, whereby an output potential $u_1$ is obtained composed of harmonics of the low frequency potential $u_0$. By the aid of a filter $F_5$ comprising parallel condenser 89 and series inductance 90 a predetermined component $u_2$ such as the second harmonic having a frequency $2v$, is segregated from the potential $u_1$. The instrument $I_4$ is constructed in the fashion of a watt meter and accordingly is responsive only to frequencies which are simultaneously impressed upon the fixed coil system 101 energized by potential $E_5$ and the movable coil 102 energized by potential $u_2$. Since $u_2$ in the example mentioned contains only the frequency $2v$, only the component $u_5$ of $E_5$, which likewise has a frequency $2v$, will contribute in producing an indication, while the influence of all the other in part disturbing components is substantially suppressed by this selective indicating method. As a result, the reading of $I_4$ in view of expressions 1 and 14 affords an undisturbed indication of the path travelled by the oscillations or in other words, of the distance $d$ to be determined. As is understood, the system described is not limited to acoustic signals but may equally employed for radio and other radiant energy signals in accordance with the spirit of the invention. Moreover, details of conventional character such as type of tubes, couplings, etc. may be varied without departing from the spirit of the invention.

Figure 7:
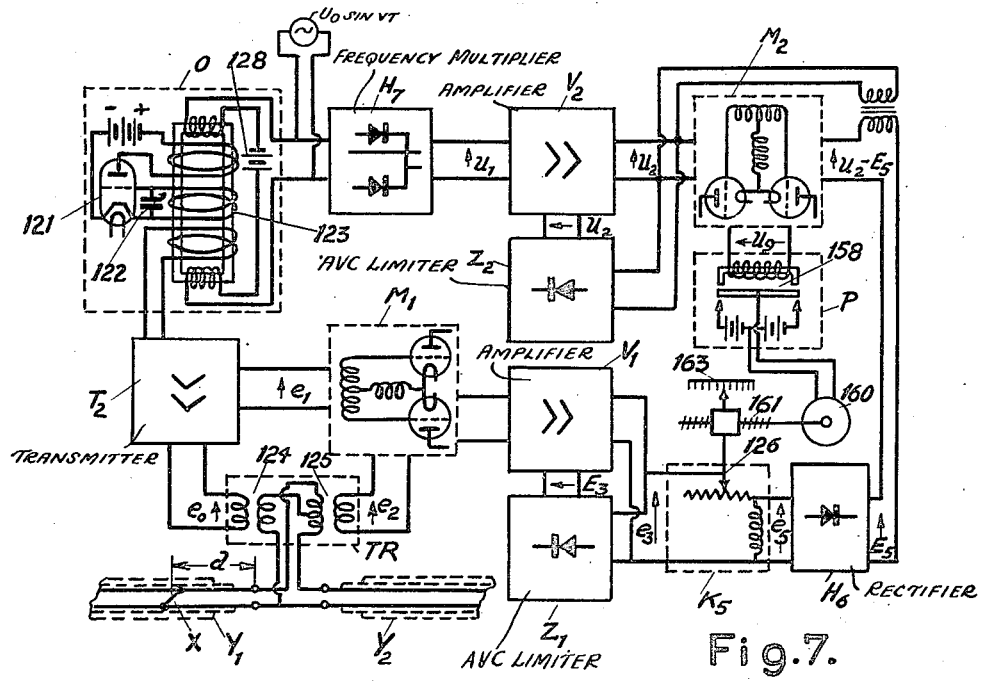

Referring to Figure 7, there is shown a further embodiment of the invention designed for measuring the distance of reflecting points in an electric transmission line such as a cable. The oscillation generator O comprises an electron tube 121 provided with regeneratively coupled anode and grid circuits; the grid tank or oscillator circuit comprises a condenser 122 shunted by an inductance coil 123. The grid and plate circuits are coupled through a common iron core premagnetized by a direct current supplied by battery 128 upon which is superimposed a low frequency modulating potential $u_0$ in such a manner as to cause a periodic variation of the generator frequency. The oscillations after amplification in the power amplifier $T_2$ are impressed through a repeater 124 and the primary of further repeater 125 of a decoupling system $T$ upon the line or cable $Y_1$—$Y_2$. A short circuit at the point X of the line represents a point from which the oscillations are reflected back to the transmitting point and applied as retarded oscillations $e_2$ through the repeater 125 to the modulator $M_1$. In the latter, which in the example is a balanced modulator, the intermodulation product between $e_1$ and $e_2$ is formed in ...er similar to that described hereinbefore
...ing in a beat frequency signal $e_3$ which
...ther amplified by amplifier $V_1$. A portion
...e signal $e_3$ serves to produce an A. V. C.
...tial by means of a system $Z_1$ to maintain
...ignal amplitude at a constant level in a
...ier similar to that described in connection
...Figure 6. The potential $e_3$ is applied to
work or demodulating circuit $K_5$ to convert
...requency modulated potential into a cor-
...nding amplitude modulated signal $e_5$ which
...is rectified by rectifier $H_6$, resulting in a
control potential $E_5$. The network $K_5$ in
...xample shown comprises a series resistance
..., parallel inductance, the former being pro-
...with a variable contact member 126 for
...ting the signal amplitude of $E_5$ which lat-
...aries in proportion to the momentary beat
...ency $w_3$ according to a predetermined rela-
...iip determined by the propagation char-
...istics of the network $K_5$. At the same time
...is produced from the modulating frequency
harmonic $u_1$ by the aid of a multiplication
...n $H_7$ whose frequency may be equal to $2v$.
...harmonic is amplified in $V_2$ and maintained
...nstant amplitude by the aid of volume con-
...ircuit $Z_2$ producing an A. V. C. potential
...The potential $u_2$ of constant amplitude is
...d on the one hand to one pair of input
...nals of the modulator $M_2$ which may be
...anced modulator as shown in the diagram
...n the other hand to the other pair of input
...nals of the modulator $M_2$ in series and
...ing relation to the output control poten-
...$l_5$.
...e operation of this arrangement is as fol-
...if the component $u_5$ of $E_5$ having a fre-
...:y equal to $2v$ has an amplitude equal to
...mplitude of $u_2$, the frequency $2v$ in the dif-
...ce potential $(u_2-E_5)$ applied to the modu-
...will disappear and as a result thereof also
...lirect current component $U_9$ produced in
...utput of the modulator by intermodulation
...and $(u_2-E_5)$. If, on the other hand, $u_5$
...ater or smaller than $u_2$, the input poten-
...applied to the modulator $M_2$ will include
...onents of the same frequency $2v$ in the
...or opposite phase position in such a man-
...hat a negative or positive direct current
...onent $U_9$ will be included in the modulation
...ict. This direct current component serves
...ergize the polarized relay 158 of the con-
...:ircuit P, thereby starting a motor 160 in
...r the other direction. The motor drives
...idle 161 operating the variable contact 126
...the component $u_5$ of $E_5$ assumes the same
...tude as $u_2$. Thus the position of the con-
...is dependent upon the average beat fre-
...:y $w_3$ and in turn upon the distance trav-
...by the oscillations towards and from the
...;e point. This distance may be directly read
...a scale 163 associated with adjustable con-
...126. Since all components of $E_5$ whose fre-
...:y deviates from $2v$ will not produce a direct
...nt of the modulation product and therefore
...not exert any influence on the relay 158,
...method is highly selective in preventing
...iirable and interfering components from
...icing errors and otherwise disturbing the
...ice indication.
...the arrangement according to Figure 8,
...:ontrol magnitudes are employed for the
...ice determination. The frequency modu-
...ice oscillations $e_0$ transmitted by the trans-
...r T and received as oscillations $e_2$ by the receiver R are mixed or inter-modulated with the non-retarded oscillations $e_1$ to produce an alternating potential of varying intermediate frequency $w_3$. After amplification of this potential in amplifier V, two alternating potentials $E_6$ and $E_7$ are produced by transmission through separate slope circuits or networks $K_6$ and $K_7$ to convert frequency changes into amplitude changes, said circuits having different slopes or propagation characteristics dependent on frequency and rectifiers $H_8$ and $H_9$, respectively. The amplitude ratio of a pair of components of like frequency $u_6$ and $u_7$ segregated from the potentials $E_6$ and $E_7$ by means of filters $F_6$ and $F_7$ bears a predetermined relation to the transmitting period $t_0$ or distance $d$ in accordance with Equation 23. The ratio measurement may be carried out by the aid of an instrument $I_5$ which may be a crossed-coil quotient meter or any other device suitable for indicating the ratio of a pair of signal potentials or currents. Alternatively, the potentials $u_6$ and $u_7$ may be rectified and applied to a direct current quotient meter such as a crossed-coil instrument.

In Figure 9 there is shown a similar arrangement, wherein the comparison of the controlling magnitudes is carried out by the employment of a modulation process. The oscillations $e_1$ directly applied from the transmitter to the receiver $R_1$ are combined with the oscillations $e_2$ received after reflection and rectified in $R_2$, thus producing a potential $e_3$ at beat frequency $w_3$. By transmission through the networks $K_6$ and $K_7$ and rectifiers $H_8$ and $H_9$, potentials $E_6$ and $E_7$ are obtained in substantially the same manner to that described in connection with Figure 8. These control potentials vary at low frequency in proportion to the frequency variation of $e_3$ as determined by the frequency propagation characteristics $K_6$ and $K_7$. In order to effect a selective comparison between two components $u_6$ and $u_7$ of $E_4$ and $E_7$, respectively, a component $u_1$ of like frequency of $u_6$ and $u_7$ obtained by the aid of the harmonic producer $H_7$ is applied to the movable system 173 of the watt meter type relay P. The fixed system of the relay comprising the coils 171 and 172 is energized by the components $u_6$ and $u_7$ in counteracting relation, whereby the torque disappears if these components are equal to each other. Any difference between the amplitudes of the components to be compared causes a corresponding deflection of the relay, thus starting rotation of the servo-motor 174 in the one or the other direction. This motor operates the gear shaft 175 which in turn controls the adjustment of the networks $K_6$ and $K_7$ such as by differentially adjusting a pair of variable potentiometers in a manner similar to that shown in Figure 7 until the amplitudes of the components $u_6$ and $u_7$ are equalized. This adjustment is dependent upon the average beat frequency $w_3$ due to the frequency propagation characteristics of the networks and accordingly may serve as an indication of the transmitting period $t_0$ or distance $d$ to be determined. Thus, this system also affords a selective indication due to the fact that all components of $E_6$ and $E_7$ which differ in frequency from $u_2$ will not produce any torque of the relay P.

Figure 5:
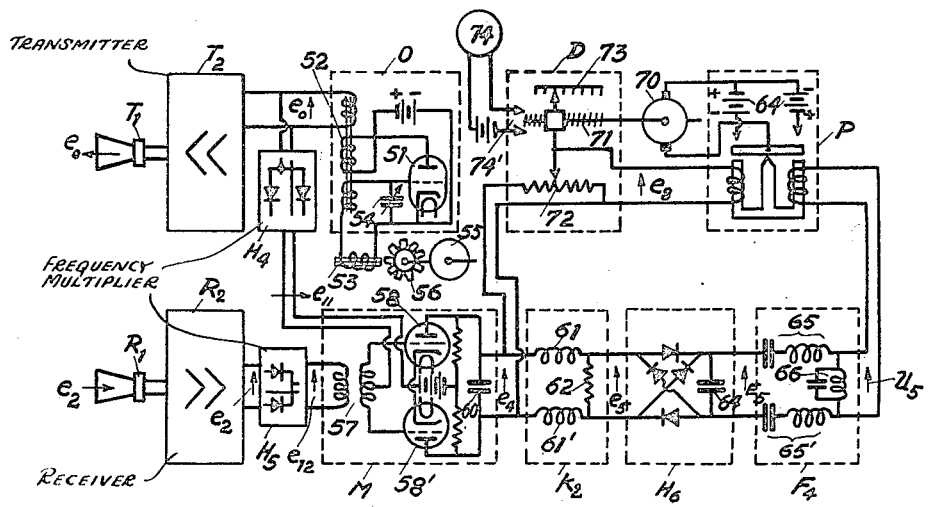

As will be obvious from the foregoing, there are numerous applications and uses to which the invention may be put. Thus, as pointed out, systems of the type described may serve as an altimeter or terrain clearance indicator to afford a direct reading indication of the height of an aeroplane above ground or the distance from an obstacle in the course of any moving craft. When using acoustic or compressional waves, the invention may serve for depth sounding purposes for use on ships, submarines, etc. Means for producing an automatic warning signal such as shown in Figure 5 may be employed to indicate an extreme or danger condition, or the system according to the invention may serve for automatically controlling a steering device as explained and shown in Figure 4. Furthermore, the invention is not limited to determining the distance of a fixed point but equally applies to the measurement of the distance of movable objects such as aeroplane, ship, etc., from a fixed point on the ground. The invention has a further use in the field of electrical prospecting for investigating geological deposits by transmitting the frequency modulated oscillations in the form of ground waves and receiving oscillations after reflection by geological strata such as mineral or other deposits. Another application resides in the determination of faults or short circuits in transmission lines such as cables as described in connection with Figure 7.

Normally, the transmitter and receiver are arranged at close distance from each other, whereby the direct transmission time to the receiver is of negligibly small value. However, there may be cases such as shown in Figure 10, where it is desirable to place the receiver R at a greater distance $d$ from the transmitter T. In this case the transmitting period of the directly received oscillations $e_1$ will be of appreciable influence in the distance measurement. The transmitting period $t_0$ measured is determined by the following modified expression:

$$t_o = \frac{b+d}{c_1} - \frac{a}{c_2} \qquad (26)$$

wherein $c_1$ represents the speed of propagation over the path to and from the reflecting point and $c_2$ represents the speed of propagation over the direct path from the transmitter to the receiver. The influence of the direct transmission may be rendered small by using different kinds of oscillations whose speed of propagation differs greatly such as electro-magnetic waves for the direct transmission and sound or compressional waves for the transmission to the distant point. In this case the transmission period is determined with sufficient approximation by the path $b+d$. In case of equal speed of propagation for the directly and indirectly received oscillations, the transmission time will be as follows:

$$t_o = \frac{b+d-a}{c} \qquad (27)$$

In place of a reflecting point or object, a relay transmitter may be provided at the remote point arranged to instantaneously retransmit the received oscillation such as indicated diagrammatically in Figure 11. The frequency modulated oscillations of the transmitter T are received by the receiver $R_r$ at the distant point and instantaneously re-transmitted by the transmitter $T_r$ and received by the receiver R with a delay $t_0$ according to Equation 1. The difference in transmitting time is determined in the manner described thus enabling a determination or measurement of the distance $d$ between the main transmitter and a distant transmitter located at a remote point. In this manner it is possible, for instance, to determine the distance of an aeroplane from a ground station or the distance between two moving craft such as two planes in flight.

It will be obvious from the foregoing that the invention is not limited to the specific arrangement of details and steps disclosed and described herein for illustration, but that the underlying idea and principle of the invention are susceptible of numerous variations and modification coming within the broad scope and spirit of the invention as defined in the appended claims. The specification and drawings are accordingly to be regarded in an illustrative rather than a limiting sense.

I claim:

1. A system for measuring the distance between two points in space comprising means located at one of said points for generating oscillatory energy the frequency of which varies according to a predetermined non-linear periodic function with respect to time, means for transmitting a portion of the energy generated to the second point and back therefrom to the first point, means for combining the received energy with another portion of the energy generated at the first point to produce beat energy having a periodically varying frequency depending upon the distance travelled by said first energy portion to and from said second point, further means for converting the beat energy into energy having an amplitude varying according to a predetermined relation with the beat frequency variations, and means for segregating and selectively translating the amplitude of a predetermined component of said last energy.

2. In a system as claimed in claim 1 including means for substantially suppressing amplitude variations of the beat energy prior to its application to said converting means.

3. In a system as claimed in claim 1, said last means comprising filter means for segregating a predetermined harmonic from the converted energy, and a measuring device calibrated in units of distance for indicating the amplitude of said harmonic component.

4. In a system as claimed in claim 1, said last means comprising filter means for segregating a predetermined harmonic from the converted energy, a measuring device calibrated in units of distance for indicating the amplitude of said harmonic component, and further means to indicate the rate of change of said last amplitude.

5. A system for measuring the distance between two points in space comprising means at one of said points for generating oscillatory energy the frequency of which varies periodically according to a sinusoidal function with respect to time, means for transmitting a portion of the energy generated to the second point and back therefrom to the first point, means for combining the received energy with another portion of the energy generated at the first point to produce beat energy having a periodically varying frequency depending upon the distance travelled by said first energy portion to and from the second point, further means for converting the beat energy into energy having an amplitude varying according to a predetermined relation with the beat frequency variations, and means for segregating and selectively determining the amplitude of a predetermined harmonic component of said last energy.

6. In a system for measuring the distance of a remote object comprising means for transmitting a radiant energy signal towards said object, frequency of said signal varying according a predetermined non-linear periodic function h respect to time, means for receiving the signal after reflection from said object and for coming the received signal with a local signal of character to produce a beat signal of varyfrequency depending on the distance travelled the first signal to and from said object, furr means for converting said beat signal into a ial having an amplitude varying according to oredetermined relation with the beat frency variations, and means for segregating and ctively translating a predetermined harmonic iponent of said last signal.

. In a system for determining the distance of emote object comprising means for transmit- a radiant energy signal towards said object, frequency of said signal varying periodically ording to a sinusoidal function with respect to e, means for receiving the signal after reflection from said object and for combining the reved signal with a local signal of like character to produce a beat signal of varying frency depending upon the distance travelled by l first signal to and from said object, means substantially suppressing amplitude varia- is of said beat signals, further means for conting said beat signal into a signal having an olitude varying according to a predetermined ttion with the beat frequency variations, and ins for segregating and selectively indicating amplitude of a predetermined harmonic component of said last signal.

. A system for measuring the distance been two points in space comprising means lo- ed at one of said points for generating oscilla- y signal energy the frequency of which varies ording to a predetermined non-linear periodic ction with respect to time, means for transting a portion of said energy to the second it and back therefrom to the first point, means combining the received energy with another tion of the energy generated at the first point produce beat energy having a periodically ying frequency depending upon the distance velled by said first energy portion to and from l second point, means for producing a first tric magnitude proportional to the amplitude aid beat energy, further means for converting l beat energy into energy having an ampli- e varying according to a predetermined rela- ι with the beat frequency variations, means producing a second electric magnitude from l last energy varying in proportion to the ;nitude of a predetermined harmonic component of the converted beat energy, and indicatmeans for determining the ratio between l first and second magnitudes.

In a system as claimed in claim 8, said last ins being comprised of a quotient indicator brated in units of distance travelled by the ; energy portion to and from said second it.

). In a system as claimed in claim 8, said means comprising a device for differentially bining said electric magnitudes, and ampli- adjusting means for at least one of said mitudes having an operating member the po- n of which indicates the distance travelled he balance condition of said magnitudes, and e means cooperating with said operating nber.

l. In a system as claimed in claim 8, said last ns being comprised of a differential relay energized by said electric magnitudes, a servo-motor arranged to be operated by said relay, amplitude adjusting means for at least one of said magnitudes controlled by said servo-motor, and scale means cooperating with said adjusting means.

12. A system for measuring the distance between two points in space comprising means located at one of said points for generating signal waves, means for non-linearly modulating the frequency of said waves in accordance with a low frequency modulating wave, means for transmitting the modulated waves to said second point and back therefrom to the first point, means for combining the received wave energy with energy derived directly from said signal waves generated at the first point to produce beat waves having a periodically varying frequency depending upon the distance travelled by said waves to and from said second point, means for substantially suppressing amplitude variations of said beat waves, further means for converting said beat waves into an electric magnitude having an amplitude varying according to the beat frequency variations, means for producing a harmonic component of predetermined order from said modulating wave, further means for deriving a harmonic component of the same order from said magnitude, and means for comparing the amplitudes of said harmonic components.

13. In a system as claimed in claim 12, said last means being comprised of a product forming device responsive only to input currents of like frequency.

14. In a system as claimed in claim 12, said last means being comprised of a watt meter type indicating instrument energized by both said components and calibrated in units of distance travelled by said waves to and from said second point.

15. A system for measuring the distance between two points in space comprising means located at one point for generating oscillatory signal energy the frequency of which varies according to a predetermined non-linear periodic function with respect to time, means for transmitting a portion of the energy generated to the second point and back therefrom to the first point, means for combining the received energy with another portion of the energy generated at said first point to produce beat energy having a periodically varying frequency depending upon the distance travelled by said first energy portion to and from said second point, a pair of converting systems having different amplitude propagation characteristics dependent upon frequency energized by portions of the beat energy to produce magnitudes varying in proportion to the beat frequency variations, selective means for segregating harmonic components of a like predetermined order from said magnitudes, and means for comparing the amplitude of said harmonic components.

16. A method of measuring the distance between two points in space comprising the steps of generating oscillatory energy at one of said points, continuously varying the frequency of said energy according to a predetermined nonlinear periodic function with respect to time, transmitting a portion of said energy to the second point and back therefrom to the first point, combining the received energy with energy generated at the first point to produce beat energy having a periodically varying frequency depending upon the distance travelled by the first energy portion to and from said second point, means for converting the beat energy into energy having an amplitude varying according to a predetermined relation with the beat frequency variations, and segregating and selectively determining the amplitude of a predetermined component of said last energy.

17. A method of measuring the distance between two points in space comprising the steps of generating oscillatory signal energy at one point, continuously varying the frequency of said energy according to a predetermined sinusoidal function, transmitting a portion of said energy to the second point and back therefrom to the first point, combining the received energy wi another portion of the energy generated at t first point to produce beat energy having a p riodically varying frequency depending upon t distance travelled by said first energy portion and from said second point, converting the be energy into energy having an amplitude varyi according to a predetermined relation with t beat frequency variations, and segregating a selectively determining the amplitude of a pr determined harmonic component of the co verted energy.

GUSTAV GUANELLA.